United States Patent
Lai et al.

(10) Patent No.: US 9,885,601 B2
(45) Date of Patent: Feb. 6, 2018

(54) OPTICAL DETECTING DEVICE HAVING A LIGHT TIGHT COMPONENT TO BE A DIRECT TOUCH SURFACE CAPABLE OF PREVENTING LIGHT LEAKAGE

(71) Applicant: PixArt Imaging Inc., Hsin-Chu (TW)

(72) Inventors: Hung-Yu Lai, Hsin-Chu (TW); Yu-Hsiang Huang, Hsin-Chu (TW); Hung-Ching Lai, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 103 days.

(21) Appl. No.: 14/964,591

(22) Filed: Dec. 10, 2015

(65) Prior Publication Data
US 2017/0052063 A1 Feb. 23, 2017

(30) Foreign Application Priority Data
Aug. 17, 2015 (TW) .............................. 104126749 A (51) Int. Cl.
*G01J 1/02* (2006.01)
*G01S 17/02* (2006.01)
*G01S 7/481* (2006.01)

(52) U.S. Cl.
CPC ............ *G01J 1/0214* (2013.01); *G01J 1/0271* (2013.01); *G01S 7/4813* (2013.01); *G01S 17/026* (2013.01)

(58) Field of Classification Search
CPC ........ G01J 5/0025; G01J 1/0214; G01J 5/041; G01J 1/0271; G01S 17/026

USPC ......................................... 250/221, 551, 239
See application file for complete search history.

(56) References Cited

U.S. PATENT DOCUMENTS

| | | | |
|---|---|---|---|
| 8,450,879 B2 * | 5/2013 | Chilvers | H02H 3/334 307/116 |
| 8,742,350 B2 * | 6/2014 | Yao | G01S 7/4813 250/338.1 |
| 8,805,302 B2 * | 8/2014 | Pantfoerder | G01J 1/0407 455/575.8 |

* cited by examiner

*Primary Examiner* — Que T Le
(74) *Attorney, Agent, or Firm* — Winston Hsu (57) ABSTRACT

An optical detecting device includes a light source, an optical detecting component, a package structure and a light tight component. The light source outputs a sampling signal to project onto an external object. The optical detecting component is disposed by the light source and has an interval relative to the light source. The optical detecting component receives the sampling signal reflected from the external object. The package structure covers the optical detecting component and the light source, and includes an illuminating surface unit and an incident surface unit respectively corresponding to the light source and the optical detecting component, and further includes an isolation component disposed between the illuminating surface unit and the emerging surface unit. The light tight component is disposed on the isolation component to obstruct transmission path of the sampling signal from the illuminating surface unit to the incident surface without reflection by the external object.

13 Claims, 7 Drawing Sheets

OPTICAL DETECTING DEVICE HAVING A LIGHT TIGHT COMPONENT TO BE A DIRECT TOUCH SURFACE CAPABLE OF PREVENTING LIGHT LEAKAGE

BACKGROUND OF THE INVENTION

1. Field of the Invention

The present invention relates to an optical detecting device, and more particularly, to an optical detecting device capable of preventing light leakage.

2. Description of the Prior Art

Detection accuracy of the conventional optical detecting module is easily decreased due to light leakage. As the optical detecting module has low quality optical isolation, the detecting signal output by the light emitting unit may be directly transmitted to the light receiving unit before projecting onto an external object, so that the light receiving unit receives additional noise excluding the detecting signal, and quality of the optical signal is decreased to diminish the detection accuracy accordingly. As shown in FIGS. 7-8 of U.S. Pat. No. 8,888,701, the unit 102 is disposed close to the unit 103. Although the two units 715 are respectively utilized to drive the unit 102 to emit the detecting signal, and to guide the detecting signal reflected from the external object to be received by the unit 103, there has no isolation located between the unit 102 and the unit 103, and the unit 103 may receive parts of the detecting signal directly transmitted from the unit 102 without reflection by the external object. The leaked detecting signal does not have information about the external object, so that the detection accuracy of the optical detecting module is decreased while the leaked detecting signal and the reflected detecting signal are intermixed for receipt and analysis. Thus, design of an optical detecting module without light leakage is an important issue in the related industry.

SUMMARY OF THE INVENTION

The present invention provides an optical detecting device capable of preventing light leakage for solving above drawbacks.

According to the claimed invention, an optical detecting device capable of preventing light leakage is applied to a wearable device. The optical detecting device includes a light source, an optical detecting component, a package structure and a light tight component. The light source is adapted to output a sampling signal for projecting onto an external object. The optical detecting component is disposed by the light source and has an interval relative to the light source. The optical detecting component is adapted to receive the sampling signal reflected from the external object for parameter analysis of the external object. The package structure covers the optical detecting component and the light source. The package structure includes an illuminating surface unit, an incident surface unit and an isolation component. Position of the illuminating surface unit and the incident surface unit respectively correspond to the light source and the optical detecting component, and the isolation component is disposed between the illuminating surface unit and the emerging surface unit. The light tight component is disposed on the isolation component and adapted to avoid the sampling signal from projecting onto the incident surface unit without reflection by the external object.

According to the claimed invention, the package structure further includes a plurality of lateral walls respectively disposed around the isolation component, and the illuminating surface unit and the incident surface unit are formed between the isolation component and the plurality of lateral walls. The transparent glue is irrigated between the isolation component and the plurality of lateral walls. The light tight component includes a plurality of contacting portions respectively disposed on the isolation component and the plurality of lateral walls to obstruct the transparent glue leaked out of the illuminating surface unit and/or the incident surface unit. A distance between two adjacent contacting portions of the plurality of contacting portions is identical with or different from a width of the illuminating surface unit and/or the incident surface unit.

According to the claimed invention, the light tight component includes a first assembling portion, the isolation component includes a second assembling portion, and the first assembling portion and the second assembling portion are assembled to obstruct leakage path between the illuminating surface unit and the incident surface unit. The first assembling portion and the second assembling portion respectively are a protrusion and a sunken structure. The optical detecting device further includes an opaque resilient component disposed between the first assembling portion and the second assembling portion.

According to the claimed invention, the optical detecting device further includes a protecting component disposed above the light tight component and connected to the package structure. The protecting component includes a main body and a plurality of transparent portions. The plurality of transparent portions is disposed inside several holes formed on the main body and respectively corresponds to the illuminating surface unit and the incident surface unit. The light tight component is disposed between the main body and the isolation component. The light tight component is made of opaque resilient material. The optical detecting device further includes a protruding portion located above the isolation component and between the light source and the optical detecting component. The protruding portion is disposed on the isolation component optionally through an object. A concave structure is formed on a lateral surface of the light tight component, and a transparent sheltering plate is disposed on the concave structure to shelter at least one of the light source and the optical detecting component.

The optical detecting device of the present invention disposes the isolation component inside the package structure to form two chambers where inside the light source and the optical detecting component are respectively accommodated, and the sampling signal output by the light source is not directly transmitted to the optical detecting component in the package structure. The optical detecting device further can dispose the light tight component on the package structure, and the light tight component is preferably located above the isolation component, to prevent the sampling signal emerging out of the package structure from projecting onto the optical detecting component inside the package structure without reflection by the external object. The present invention provides three embodiments about the leak-proofing function of the optical detecting device. For instance, the light tight component can vertically stretch from the isolation component to avoid direct projection of the sampling signal and leakage of the transparent glue, the light tight component can be matched with the isolation component to form overlapped structure for obstructing direct transmission of the sampling signal, and the light tight component can be an opaque resilient unit to fill between the protecting component and the isolation component by resilient deformation. The optical detecting device of the present invention has advantages of easy assembly and low manufacturing cost for the leak-proofing function, which can effectively avoid light leakage and increase optical detecting accuracy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
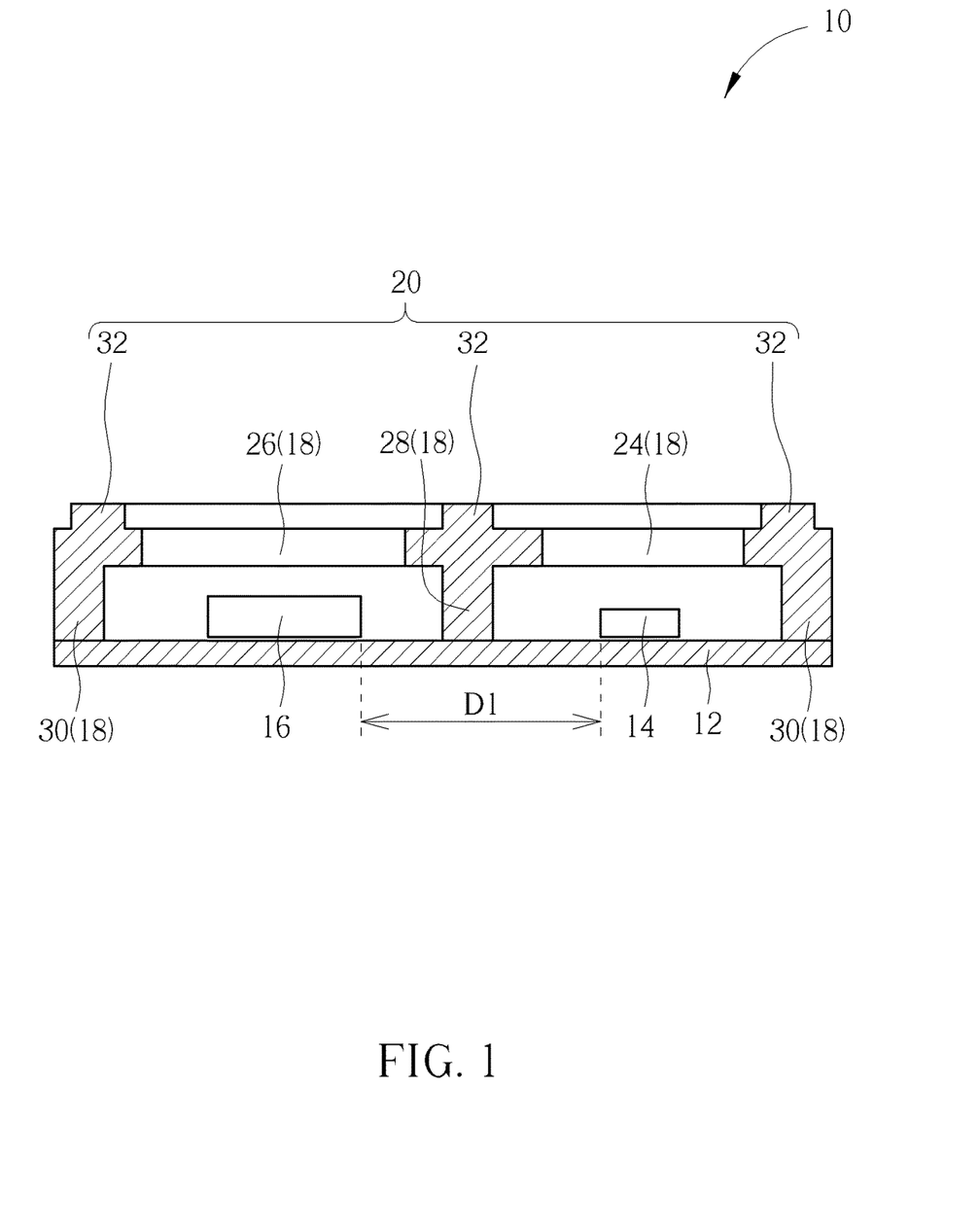
FIG. 1 and FIG. 2 respectively are diagrams of an optical detecting device in different manufacturing procedures according to a first embodiment of the present invention.
Figure 2:
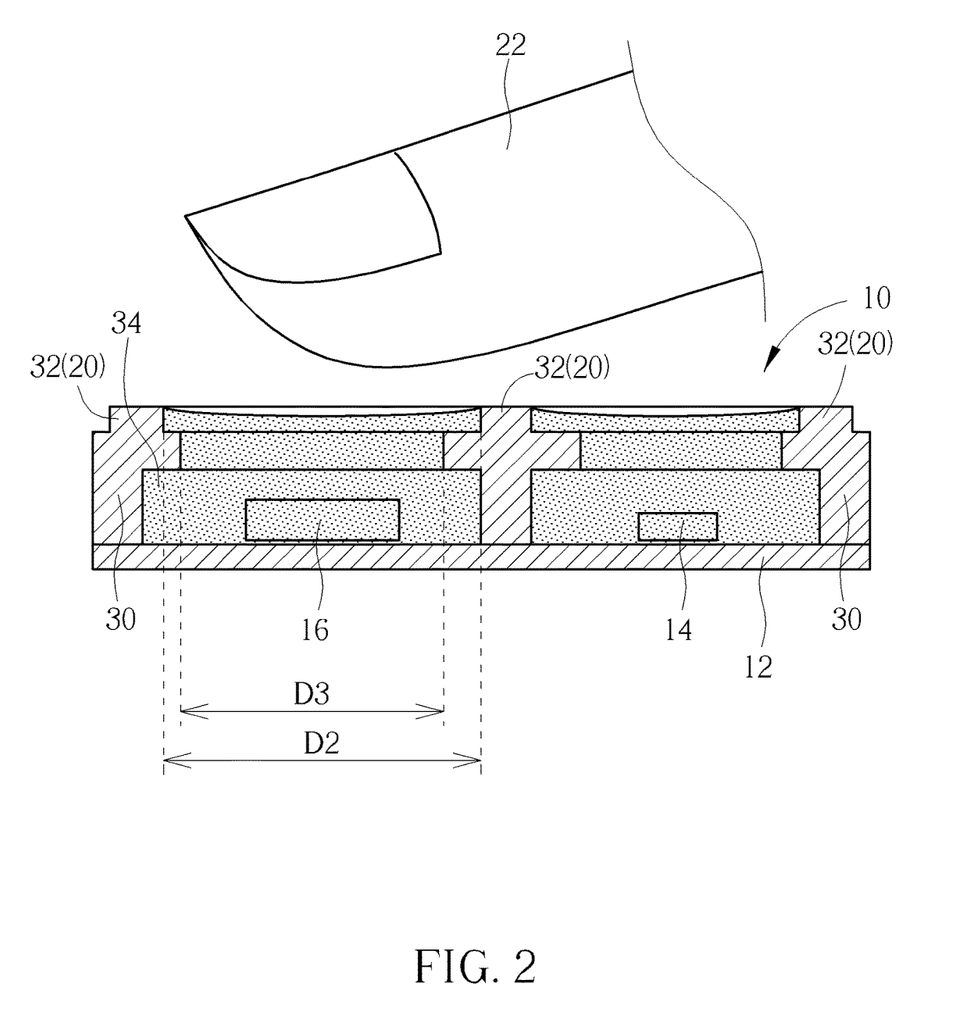

Please refer to FIG. 1 and FIG. 2. FIG. 1 and FIG. 2 respectively are diagrams of an optical detecting device 10 in different manufacturing procedures according to a first embodiment of the present invention. The optical detecting device 10 includes a circuit board 12, a light source 14, an optical detecting component 16, a package structure 18 and a light tight component 20. The optical detecting device 10 is often installed on the wearable device, such as the mobile phone and the smart wristband. The circuit board 12 can be independent from the wearable device or be a built-in unit inside the wearable device, which depends on design demand. The light source 14 is disposed on the circuit board 12 and adapted to output a sampling signal projecting onto an external object 22. The external object 22 is skin tissue of the user, such as the finger or the wrist. The optical detecting component 16 is disposed by the light source 14 and has an interval D1 relative to the light source 14, which means the light source 14 is not next to the optical detecting component 16. The optical detecting component 16 is utilized to receive the sampling signal reflected from the external object 22 for acquiring parameters of the external object 22 (such as biological characteristics of the user) by analyzing optical property variation of the sampling signal.

The package structure 18 mainly includes an illuminating surface unit 24, an incident surface unit 26, an isolation component 28 and several lateral walls 30. The plurality of walls 30 is disposed around the isolation component 28 in symmetric arrangement. The illuminating surface unit 24 and the incident surface unit 26 respectively are formed between the isolation component 28 and the lateral walls 30. The illuminating surface unit 24 and the incident surface unit 26 can be hole structures, and have positions respectively corresponding to the light source 14 and the optical detecting component 16. The sampling signal output by the light source 14 can pass through the illuminating surface unit 24 to project onto the external object 22, and the sampling signal reflected from the external object 22 pierces through the incident surface unit 26 to be received by the optical detecting component 16. As shown in FIG. 1 and FIG. 2, the light source 14 and the optical detecting component 16 are completely covered by the package structure 18, the plurality of lateral walls 30 is disposed around the light source 14 and the optical detecting component 16, the isolation component 28 is disposed between the illuminating surface unit 24 and the incident surface unit 26. That is, the isolation component 28 is located within a range of the interval D1 between the light source 14 and the optical detecting component 16, and can be utilized to prevent the sampling signal output by the light source 14 from directly projecting onto the optical detecting component 16 (which means internal transmission of the sampling signal inside the package structure 18 is obstructed by the isolation component 28), without reflection by the external object 22.

The light tight component 20 is disposed on the isolation component 28 at least, to prevent the sampling signal emerging out of the illuminating surface unit 24 from projecting onto the incident surface unit 26 to be received by the optical detecting component 16 without reflection by the external object 22. According to structural design of the isolation component 28 and the light tight component 20, the optical detecting device 10 can effectively avoid leakage of the sampling signal. In the first embodiment of the present invention, as shown in FIG. 1, the light tight component 20 mainly includes a plurality of contacting portions 32 respectively disposed on the isolation component 28 and the lateral walls 30. As shown in FIG. 2, the package structure 18 includes transparent glue 34 irrigated into chambers (which are utilized to accommodate the light source 14 and the optical detecting component 16) between the isolation component 28 and the lateral walls 30. Quantity of the transparent glue 34 is preferably equal to volume of the foresaid chambers. The contacting portion 32 disposed above the isolation component 28 and the lateral walls 30 is utilized to obstruct part of the transparent glue 34 leaking out of the illuminating surface unit 24 and/or the incident surface unit 26.

Figure 3:
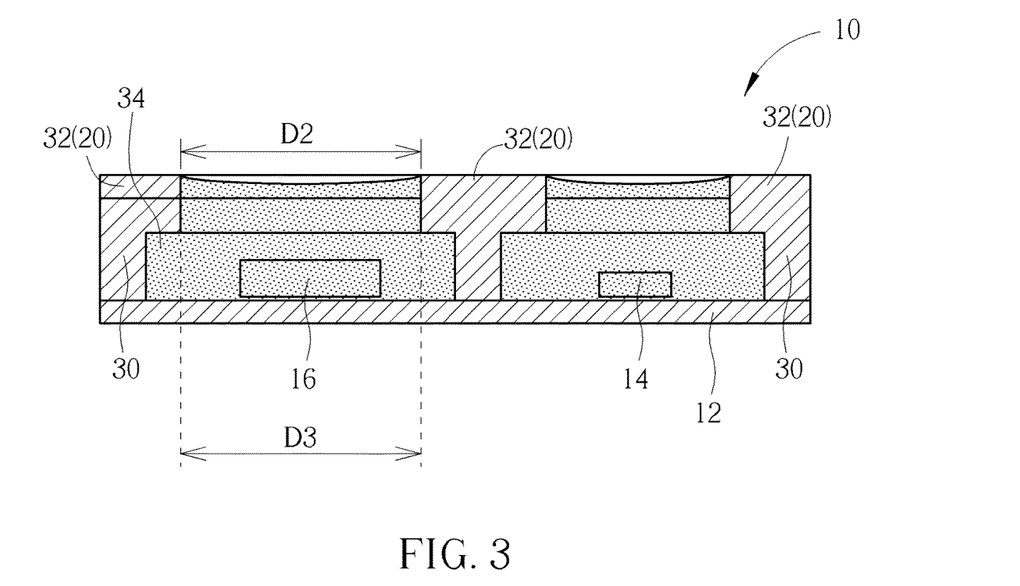
FIG. 3 is a diagram of the optical detecting device in another type according to the first embodiment of the present invention.

As the first embodiment shown in FIG. 1 and FIG. 2, a distance D2 between any two adjacent contacting portions 32 of the plurality of contacting portions 32 is different from a width D3 of the illuminating surface unit 24 and/or the incident surface unit 26; for example, the distance D2 can be greater than, but not limited, the width D3. Therefore, the stage structure can be formed between the contacting portion 32 and the isolation component 28 or the lateral wall 30, providing buffer space to accommodate the transparent glue 34 leaking out of the illuminating surface unit 24 and/or the incident surface unit 26. In addition, the distance D2 can be substantially equal to the width D3, the structural width of the contacting portion 32 may be identical with the structural widths of the isolation component 28 and the lateral wall 30. Please refer to FIG. 3. FIG. 3 is a diagram of the optical detecting device 10 in another type according to the first embodiment of the present invention. The contacting portion 32 can be defined as vertical structure stretching from the isolation component 28 and the lateral wall 30.

Figure 4:
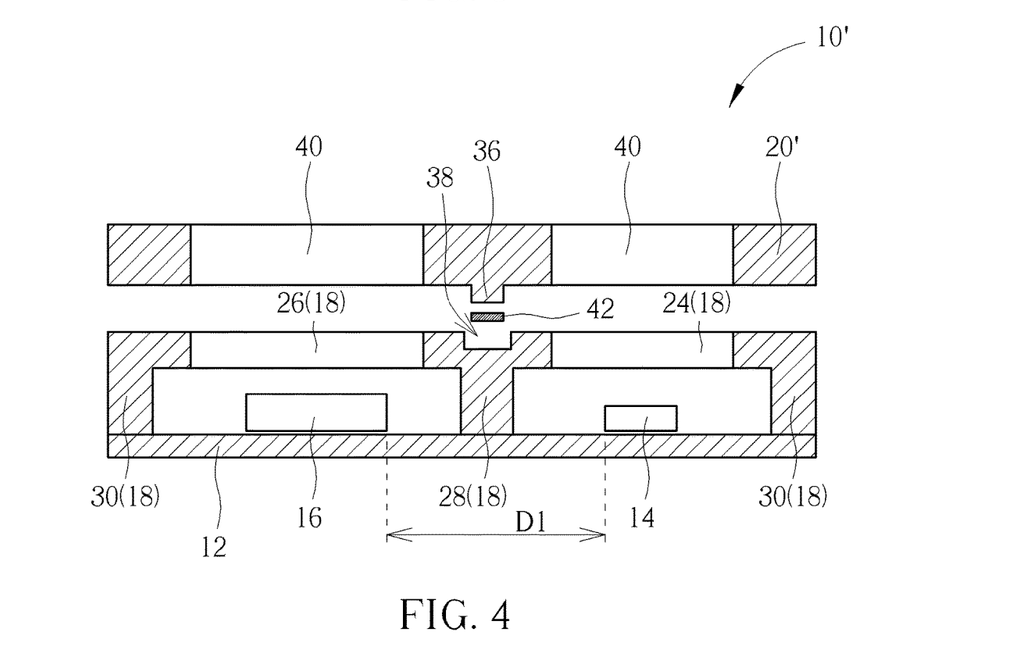
FIG. 4 and FIG. 5 respectively are diagrams of the optical detecting device in different assembling procedures according to a second embodiment of the present invention.
Figure 5:
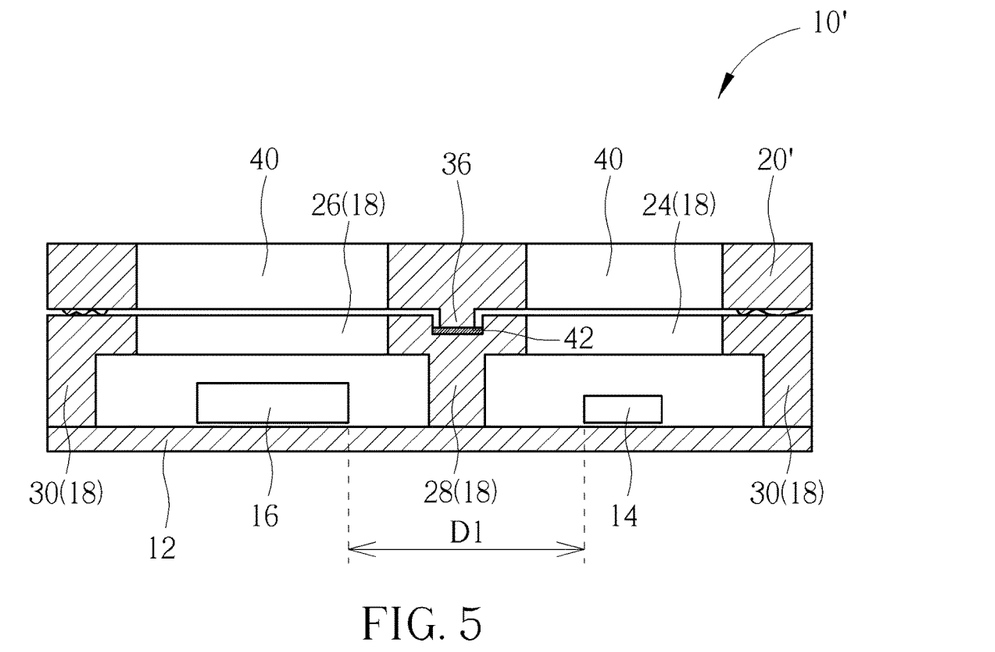

Please refer to FIG. 4 and FIG. 5. FIG. 4 and FIG. 5 respectively are diagrams of the optical detecting device 10' in different assembling procedures according to a second embodiment of the present invention. In the second embodiment, elements having the same numeral as ones of the first embodiment have the same structures and functions, and a detailed description is omitted herein for simplicity. Difference between the first embodiment and the second embodiment is: the light tight component 20' of the optical detecting device 10' includes two transparent regions 40 respectively corresponding to the illuminating surface unit 24 and the incident surface unit 26. Transparent isolating material is filled inside holes on the light tight component 20' to form the transparent region 40, so that the sampling signal can freely pass through the transparent regions 40 to project onto and be reflected from the external object 22 accordingly. The light tight component 20' further includes a first assembling portion 36, and the isolation component 28' further includes a second assembling portion 38. As shown in FIG. 5, the light tight component 20' is disposed above the isolation component 28', the first assembling portion 36 is assembled with the second assembling portion 38 by overlap, so as to obstruct the leakage path between the illuminating surface unit 24 and the incident surface unit 26, and to avoid the sampling signal emerging out of the illuminating surface unit 24 from projecting onto the incident surface unit 26 without reflection by the external object 22.

In order to increase leak-proofing efficiency of the optical detecting device 10', the optical detecting device 10' optionally includes an opaque resilient component 42 disposed between the first assembling portion 36 and the second assembling portion 38. The opaque resilient component 42 can be adequately filled into a gap between the first assembling portion 36 and the second assembling portion 38 while the opaque resilient component 42 is deformed by external compression, so as to effectively obstruct a transmission path of the sampling signal through the foresaid gap. As shown in FIG. 4 and FIG. 5, the first assembling portion 36 and the second assembling portion 38 respectively can be, but not limited, a protrusion and a sunken structure. For instance, the first assembling portion 36 and the second assembling portion 38 respectively can be the sunken structure and the protrusion reverse to the above-mentioned embodiment, or be structures with any types. Design of any wedging structure capable of obstruct the straight transmission path of the sampling signal belongs to a scope of the present invention.

Figure 6:
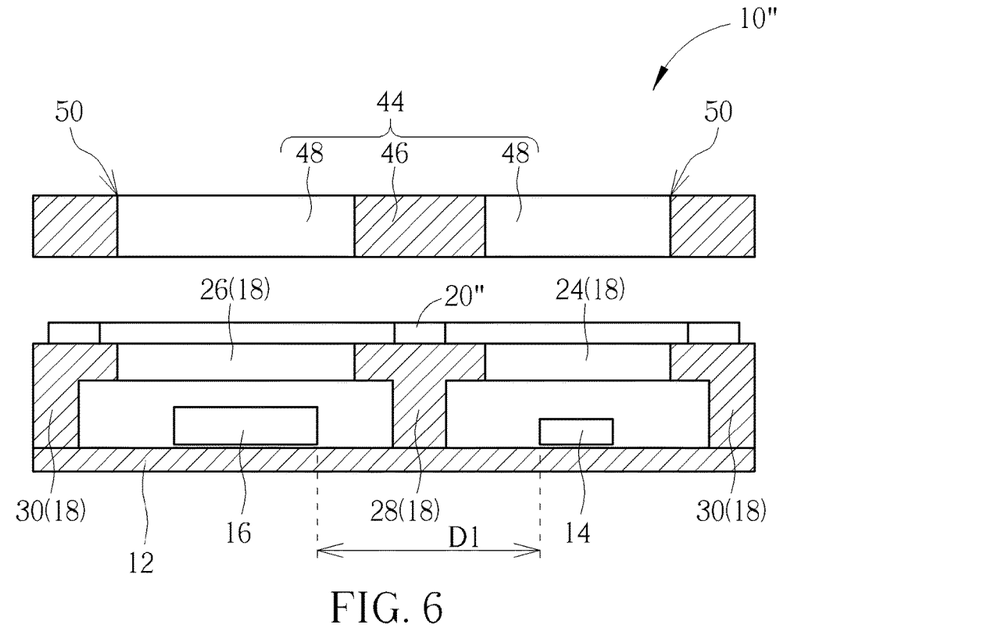
FIG. 6 and FIG. 7 respectively are diagrams of the optical detecting device in different assembling procedures according to a third embodiment of the present invention.
Figure 7:
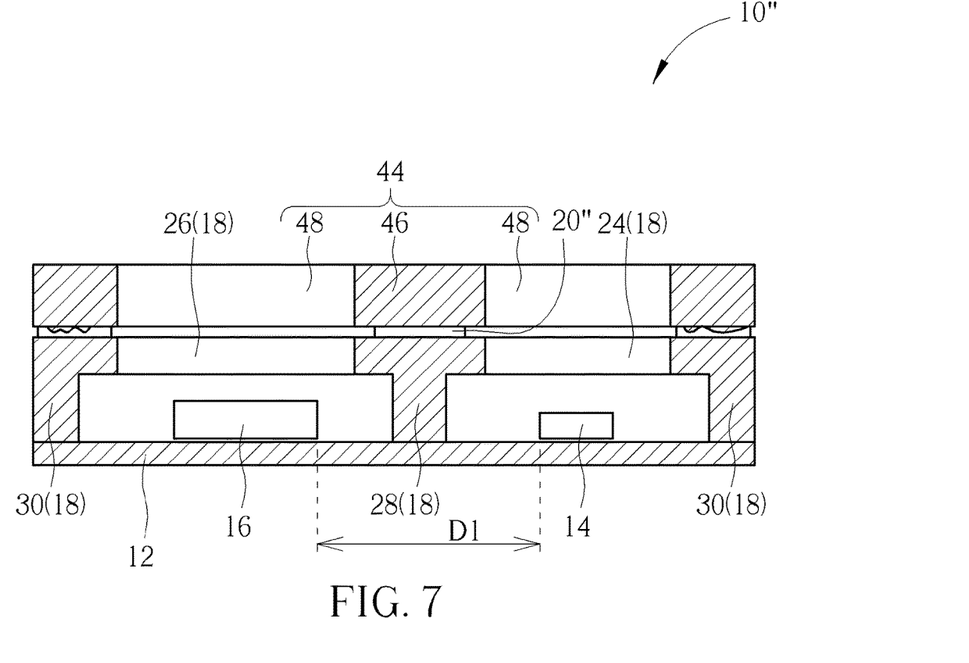

Please refer to FIG. 6 and FIG. 7. FIG. 6 and FIG. 7 respectively are diagrams of the optical detecting device 10" in different assembling procedures according to a third embodiment of the present invention. In the third embodiment, elements having the same numerals as ones of the above-mentioned embodiments have the same structures and functions, and the detailed description is omitted herein for simplicity. Difference between the third embodiment and the foresaid embodiments is: the optical detecting device 10" further includes a protecting component 44 disposed above the light tight component 20" and connected to the package structure 18 via the double sided tape. The protecting component 44 includes a main body 46 and a plurality of transparent portions 48. The plurality of transparent portions 48 is disposed inside holes 50 on the main body 46 accordingly, and position of the transparent portions 48 respectively correspond to the illuminating surface unit 24 and the incident surface unit 26. The light tight component 20" is preferably made by opaque resilient material. The light tight component 20" can be designed as an annular form or a rectangle form according to a shape of the package structure 18. The physical portion of the light tight component 20" is disposed on the isolation component 28 and the lateral wall 30, the hollow portion of the light tight component 20" aligns with the illuminating surface unit 24 and the incident surface unit 26. While the protecting component 44 presses the light tight component 20" and is connected with the package structure 18, the light tight component 20" is deformed to fill a gap between the main body 46 and the isolation component 28, so as to effectively prevent the sampling signal emerging out of the illuminating surface unit 24 from projecting onto the incident surface unit 26 through the foresaid gap.

Figure 8:
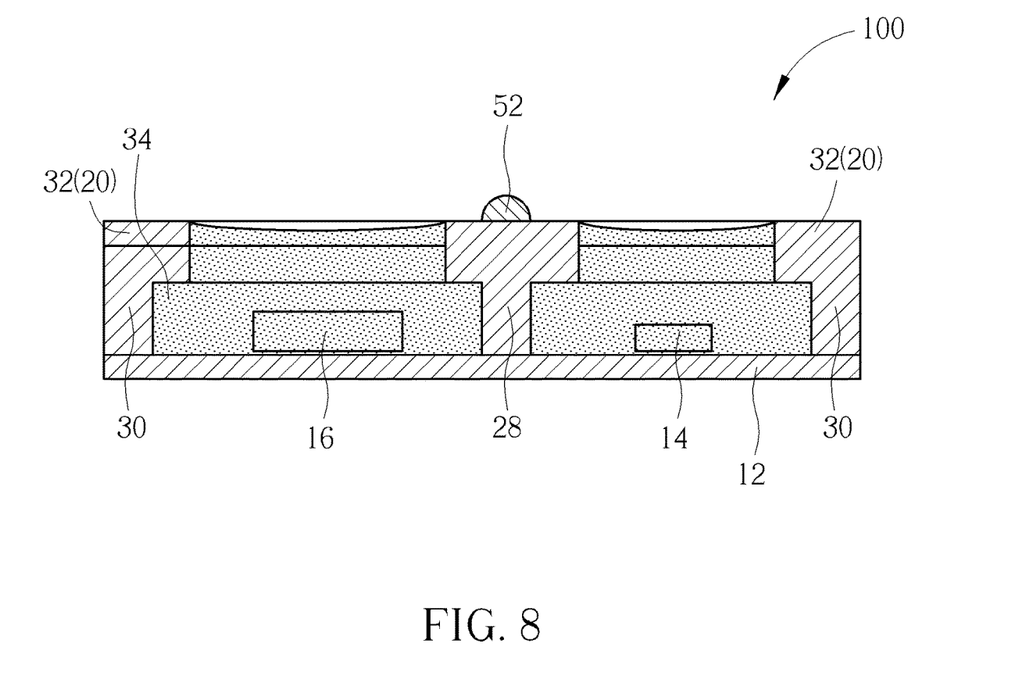
FIG. 8 is a diagram of the optical detecting device according to a fourth embodiment of the present invention.

Please refer to FIG. 8. FIG. 8 is a diagram of the optical detecting device 100 according to a fourth embodiment of the present invention. The optical detecting device 100 further can include a protruding portion 52 located above the isolation component 28. The touch surface of the optical detecting device 100 is usually a flat surface. If the touch surface is not the flat surface, the sampling signal output by the light source 14 may pass through the gap between the external object 22 and the touch surface to directly project onto the optical detecting component 16 while the external object 22 presses over the touch surface, which means the sampling signal is not reflected by the external object 22. Therefore, the protruding portion 52 disposed above the isolation component 28 not only can stretch a length of the isolation component 28 between the light source 14 and the optical detecting component 16, but also substantially contacts against the external object 22 to eliminate the tiny gap between the external object 22 and the isolation component 28. The greatest height of the protruding portion 52 is normally not over 1 mm, and its preferred height can be smaller than 0.4 mm. A shape, a width and a length of the protruding portion 52 are not limited to the embodiment shown in FIG. 8, and the model of the protruding portion 52 may be the elongated form, the wavy form or the discontinuous from optionally, which depend on actual demand.

The protruding portion 52 is not limited to be tightly connected with the isolation component 28; for example, the protruding portion 52 can be disposed on the isolation component 28 optionally via a specific article. In the fourth embodiment, the protruding portion 52 is disposed on the isolation component 28 by the contacting portion 32, and the foresaid specific object represents the contacting portion 32. The related specific object further can be defined as other types. For example, while the protruding portion 52 is applied to the second embodiment, the protruding portion 52 can be indirectly disposed on the isolation component 28 via the light tight component 20' (which is represented as the specific article), and the protruding portion 52 is located between the two transparent regions 40. While the protruding portion 52 is applied to the third embodiment, the protruding portion 52 can be indirectly disposed on the isolation component 28 via the protecting component 44 (which is represented as the specific article), and the protruding portion 52 is located between the two transparent portions 48.

Figure 9:
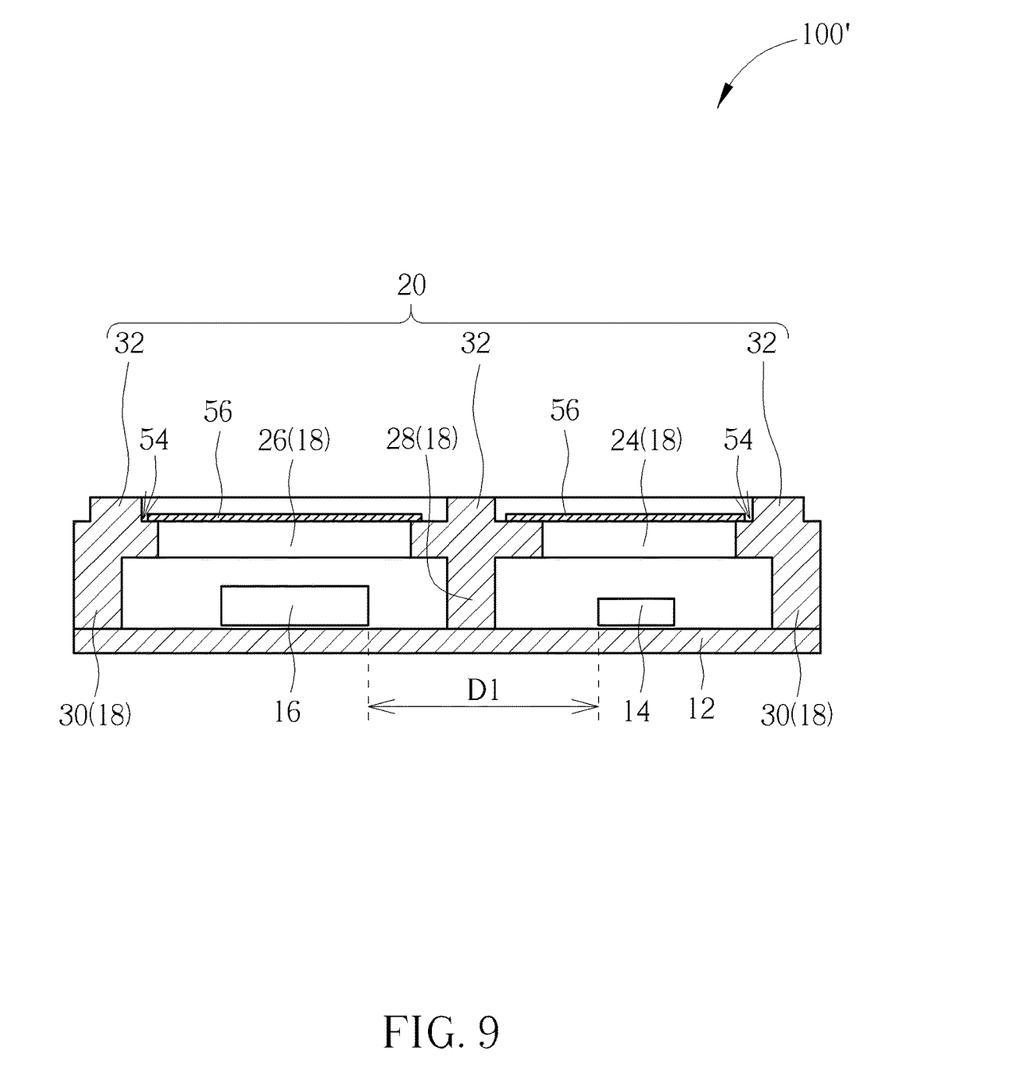
FIG. 9 is a diagram of the optical detecting device according to a fifth embodiment of the present invention.

Moreover, the optical detecting device may have no transparent glue irrigated inside the package structure and have no protecting component disposed on the package structure. Please refer to FIG. 9. FIG. 9 is a diagram of the optical detecting device 100' according to a fifth embodiment of the present invention. A concave structure 54 can be disposed on a lateral surface of the light tight component 20 of the optical detecting device 100', and a rigid transparent sheltering plate 56 is disposed on the concave structure 54. The transparent sheltering plate 56 can be made of transparent glass or transparent/dark brown plastic. The transparent sheltering plate 56 is engaged with the concave structure 54 to directly cover the illuminating surface unit 24 and/or the incident surface unit 26, so as to shelter at least one of the light source 14 and the optical detecting component 16.

In conclusion, the optical detecting device of the present invention disposes the isolation component inside the package structure to form two chambers where inside the light source and the optical detecting component are respectively accommodated, and the sampling signal output by the light source is not directly transmitted to the optical detecting component in the package structure. The optical detecting device further can dispose the light tight component on the package structure, and the light tight component is preferably located above the isolation component, to prevent the sampling signal emerging out of the package structure from projecting onto the optical detecting component inside the package structure without reflection by the external object. The present invention provides three embodiments about the leak-proofing function of the optical detecting device. For instance, the light tight component can vertically stretch from the isolation component to avoid direct projection of the sampling signal and leakage of the transparent glue, the light tight component can be matched with the isolation component to form overlapped structure for obstructing direct transmission of the sampling signal, and the light tight component can be an opaque resilient unit to fill between the protecting component and the isolation component by resilient deformation. Comparing to the prior art, the optical detecting device of the present invention has advantages of easy assembly and low manufacturing cost for the leak-proofing function, which can effectively avoid light leakage and increase optical detecting accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical detecting device capable of preventing light leakage and being applied to a wearable device, the optical detecting device comprising:
   a light source adapted to output a sampling signal for projecting onto an external object;
   an optical detecting component disposed by the light source and having an interval relative to the light source, the optical detecting component being adapted to receive the sampling signal reflected from the external object for parameter analysis of the external object;
   a package structure covering the optical detecting component and the light source, the package structure comprises an illuminating surface unit, an incident surface unit and an isolation component, position of the illuminating surface unit and the incident surface unit respectively corresponding to the light source and the optical detecting component, the isolation component being disposed between the illuminating surface unit and the incident surface unit; and
   a light tight component disposed on the isolation component to be a touch surface directly pressed by the external object and adapted to avoid the sampling signal from projecting onto the incident surface unit without reflection by the external object.

2. The optical detecting device of claim 1, wherein the package structure further comprises a plurality of lateral walls respectively disposed around the isolation component, the illuminating surface unit and the incident surface unit are formed between the isolation component and the plurality of lateral walls.

3. The optical detecting device of claim 1, wherein transparent glue is irrigated between the isolation component and the plurality of lateral walls, the light tight component comprises a plurality of contacting portions respectively disposed on the isolation component and the plurality of lateral walls to obstruct the transparent glue leaked out of the illuminating surface unit and/or the incident surface unit.

4. The optical detecting device of claim 3, wherein a distance between two adjacent contacting portions of the plurality of contacting portions is identical with or different from a width of the illuminating surface unit and/or the incident surface unit.

5. The optical detecting device of claim 1, wherein the light tight component comprises a first assembling portion, the isolation component comprises a second assembling portion, the first assembling portion and the second assembling portion are assembled to obstruct leakage path between the illuminating surface unit and the incident surface unit.

6. The optical detecting device of claim 5, wherein the first assembling portion and the second assembling portion respectively are a protrusion and a sunken structure.

7. The optical detecting device of claim 5, further comprising:
   an opaque resilient component disposed between the first assembling portion and the second assembling portion.

8. The optical detecting device of claim 1, further comprising:
   a protecting component disposed above the light tight component and connected to the package structure, the protecting component comprising a main body and a plurality of transparent portions, the plurality of transparent portions being disposed inside several holes formed on the main body and respectively corresponding to the illuminating surface unit and the incident surface unit.

9. The optical detecting device of claim 8, wherein the light tight component is disposed between the main body and the isolation component.

10. The optical detecting device of claim 8, wherein the light tight component is made of opaque resilient material.

11. The optical detecting device of claim 1, further comprising:
    a protruding portion located above the isolation component and between the light source and the optical detecting component.

12. The optical detecting device of claim 11, wherein the protruding portion is disposed on the isolation component optionally through an object.

13. The optical detecting device of claim 1, wherein a concave structure is formed on a lateral surface of the light tight component, a transparent sheltering plate is disposed on the concave structure to shelter at least one of the light source and the optical detecting component.

* * * * *